United States Patent [19]

Rattunde

[11] 4,261,213
[45] Apr. 14, 1981

[54] FRICTION TRANSMISSION

[75] Inventor: Manfred Rattunde, Bad Homburg, Fed. Rep. of Germany

[73] Assignee: Werner Reimers P.I.V. Antrieb Kommanditgesellschaft, Bad Homburg, Fed. Rep. of Germany

[21] Appl. No.: 52,983

[22] Filed: Jun. 28, 1979

[30] Foreign Application Priority Data

Jun. 28, 1978 [DE] Fed. Rep. of Germany ....... 2828347

[51] Int. Cl.³ .......................................... F16H 13/10
[52] U.S. Cl. ........................................ 74/196; 91/59; 192/54; 474/18; 474/19; 474/28
[58] Field of Search ........................ 74/190, 194, 196; 474/18, 19, 21, 28; 91/59; 192/54, 56 F

[56] References Cited

U.S. PATENT DOCUMENTS

| 2,993,385 | 7/1961 | Karig et al. | 474/18 |
| 3,451,283 | 6/1969 | Rattunde | 474/18 |
| 3,526,150 | 9/1970 | Iverson | 474/28 |
| 3,596,528 | 8/1971 | Dittrich et al. | 474/28 X |
| 3,600,960 | 8/1971 | Karig et al. | 474/18 X |
| 3,704,634 | 12/1972 | Schrodt | 474/18 |
| 3,782,213 | 1/1974 | Rattunde | 474/28 |
| 3,807,539 | 4/1974 | Reed | 91/59 X |
| 3,842,637 | 10/1974 | Wilson | 474/19 |
| 4,143,558 | 3/1979 | van Deursen et al. | 474/28 |
| 4,173,156 | 11/1979 | Horowitz et al. | 474/18 X |

*Primary Examiner*—C. J. Husar
*Assistant Examiner*—Moshe I. Cohen
*Attorney, Agent, or Firm*—Spencer & Kaye

[57] ABSTRACT

A friction transmission having at least one friction disc formed as a rotating presser cylinder of a piston firmly connected with the associated shaft, with load-dependent hydraulic generation of the pressing forces, where at least on one transmission shaft a sensor is arranged for the torque transmitted there. The sensor, due to a torque-dependent movement of at least two valve parts in relation to one another, generates a torque-dependent hydraulic pressure and the necessary load-dependent hydraulic pressing force is generated exclusively by this pressure.

16 Claims, 12 Drawing Figures

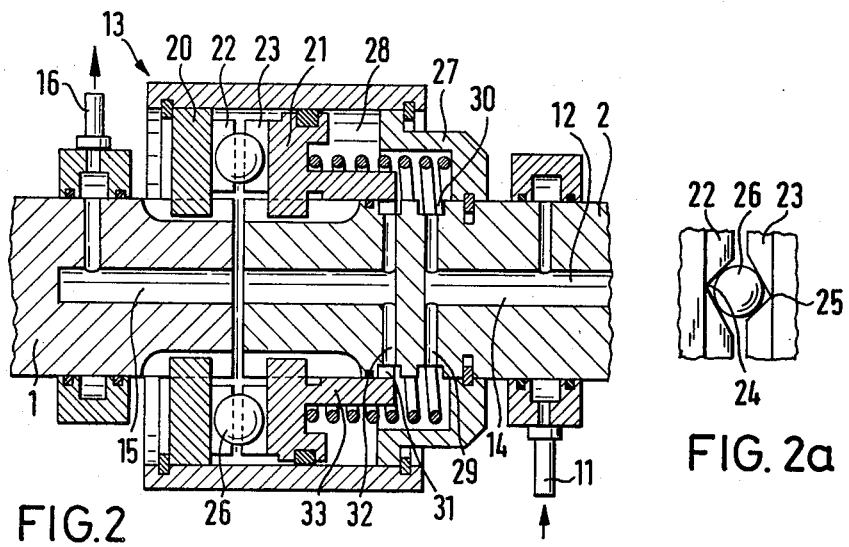
FIG. 2
FIG. 2a
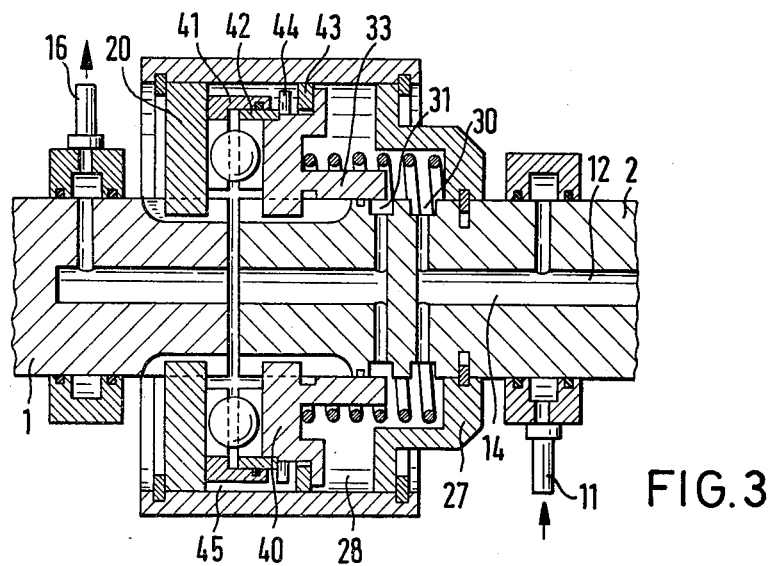
FIG. 3

FRICTION TRANSMISSION

BACKGROUND OF THE INVENTION

This invention relates generally to a friction transmission and more particularly to a friction transmission with hydraulic generation of the pressing forces between friction members.

Such friction transmissions serve primarily for effecting a stepless, or infinite adjustment of the transmission ratio. To give only a few examples here, reference may be made to cone-pulley belt-type transmissions with traction means circulating between cone-pulley pairs, cone-pulley transmissions with friction discs parallel with one another, and having rotation axes which are offset in relation to one another and between which balls guided in a cage are displaceable for transmission ratio adjustment, or friction disc transmissions with friction discs rolling one upon the other, the axes of rotation of which are arranged at right angles to one another.

It is common to all friction transmissions that the force with which the friction members are pressed against one another is to be adjusted according to load, in order to obtain as exactly as possible the necessary pressing force, since excess pressure leads to an unnecessary wear of the friction members and their mountings, while inadequate pressing causes mutual slipping and thus again excessive wear of the friction members.

Now in the friction transmissions known hitherto the new problem has arisen that on the occurrence of torque surges, an unduly long time delay occurs in the build-up of the requisite hydraulic pressure, and thus the pressing force, between the friction members. Thus slipping of the friction partners in relation to one another, with corresponding damage, becomes unavoidable.

The cause of the delay in pressure build-up in the case of a torque surge resides substantially in the elastic yieldability of the components, and more specifically is attributable to the facts that: the traction means elongates; the axial supporting yields; the oil leakage quantity increases; presser cylinder and conduits expand; and the oil is somewhat compressible. The extra demand for pressure medium, necessary thus at the increased pressure level caused by a torque surge, amounts in a medium-power transmission to several cubic centimeters.

In order to make this quantity of oil available in the requisite time of a few milliseconds, a pressure-medium pump would be necessary having an output increased substantially in comparison with the normal requirement. Another possibility would consist in making the elastic components so rigid that the requisite extra demand for oil is reduced to an acceptable amount. Both measures, and also their combination, are unacceptable however for economic reasons.

SUMMARY OF THE INVENTION

Accordingly, it is an object of this invention to produce a friction transmission in which, for suddenly occurring, especially very quickly rising, high torque surges, a special pressure medium volume is made available rapidly to generate the pressing force, without the need for an increase of the capacity of the pump for the pressure medium delivery or an over-dimensioning of the components for this purpose, that is to say in a form which otherwise has no practical effect upon the design and the purchase costs of the transmission.

It is another object of this invention to produce such a friction transmission which is simple and operationally reliable and necessitates no appreciable additional space and purchase costs.

The objects of the invention are achieved by a friction transmission having at least one friction disc formed as a rotating presser cylinder of a piston firmly connected with the associated shaft, with load-dependent hydraulic generation of the pressing forces, where at least on one transmission shaft a sensor is arranged for the torque transmitted there. The sensor, due to a torque-dependent movement of at least two valve parts in relation to one another, generates a torque-dependent hydraulic pressure and the necessary load-dependent hydraylic pressing force is generated exclusively by this pressure.

In accordance with the invention the relative movements of the valve parts leading to an increase of the application pressure can deliver a predeterminable available volume of the hydraulic pressure medium into the presser cylinder.

This measure according to the invention has the effect that the relative movement of the valve parts of the torque sensor, resulting in any case from torque surges, is exploited or extended additionally to deliver a pressure-medium volume, constantly available in the torque sensor due to appropriate design dimensioning thereof, into the presser cylinder with which the torque sensor is associated, in order thus to supplement the quantity delivered by the pressure-medium pump in a time range which is extraordinarily short and cannot be bridged over by the pressure-medium pump when it is designed for normal conditions of delivered pressure-medium volume.

Thus the possibility of the friction members slipping, even though briefly, relative to one another for lack of adequate available application force is avoided, which is advantageous since such slipping can lead to very high local temperatures and, if it occurs frequently, to damage to the friction members.

One embodiment of the present invention includes a transmission in which there is provided, in a rotating, bilaterally fluid-tightly closed, axially and circumferentially fixed cylinder on a transmission shaft, a piston which is mounted to rotate with the shaft while being axially displaceable relative thereto, serving for torque transmission on the transmission shaft and dividing the cylinder into a forward cylinder chamber and a rear cylinder chamber charged with the hydraulic pressure in a presser cylinder. In the forward cylinder chamber both the piston and the associated cylinder head carry cam pieces placed axially one before the other and one opposite to the other and provided with V-shaped recesses between which rolling bodies such as balls are inserted for torque transmission. A throttle valve for the adjustment of the hydraulic pressure acting in the presser cylinder and in the rear cylinder chamber is influenced by the axial position of the piston, determined by the transmitted torque, in such a way that this hydraulic pressure, on the one hand, suffices for the generation of the pressing force and, on the other hand, by appropriate selection of the piston surface area, balances the axial forces which are exerted on the piston and which are a function of the angle of inclination of the flanks of the V-shaped recesses in the cam pieces. In the construction of this embodiment, it has proved expedient for the rear cylinder chamber, the axial displaceability of the piston therein and going beyond the closed condition of the throttle valve, and possibly the size of the V-shaped recesses in the the cam pieces to be dimensioned on the basis of the predetermined volume of the hydraulic pressure medium, and for the access of the pressure medium at the hydraulic pressure prevailing in the presser cylinder to the rear cylinder chamber to be such that the path between the presser cylinder and rear cylinder chamber remains open over the substantial axial range of movement of the piston in the rear cylinder chamber.

The pressure medium fed to the rear cylinder chamber can here depart from this chamber through a radial bore and an adjoining axial bore of the shaft, and a control edge connected with the piston together with a groove of the shaft mounted before the radial bore can form the throttle valve.

Moreover, the access of the pressure medium to the rear cylinder chamber can be closed by a control edge connected with the piston when the piston, within its axial range of movement, is in a position closely adjacent the cylinder head which closes off the rear cylinder chamber. This prevents the piston from striking too hard against that cylinder head.

It has proved expedient to divide the transmission shaft in the region of the cam pieces, to guide the piston non-rotatably but axially displaceably on the one shaft part, to connect the cylinder head closing off the forward cylinder chamber so that it is rotatable at least with the other shaft part and is axially supported on its outer side remote from the forward cylinder chamber, and to make the connection of at least one of the cylinder heads with the cylinder jacket or between the cylinder head closing the rear cylinder chamber and the one shaft part rotatable.

A modification is possible in the case of an undivided shaft wherein the piston is guided rotatably and axially displaceably on the shaft and the torque is introduced through it into the transmission. By way of example, the piston is extended, with an axially extending flange, in a liquid-tight manner out of the rear cylinder chamber.

Another modification is possible wherein one of the cylinder heads is the friction disc that is fast with the shaft or is the piston of the presser cylinder. If, however, the cylinder heads are provided as separate components, the torque sensor can be provided as a separate unit which can be added to a basic transmission with purely hydraulic pressing, according to need, in the manner of prefabricated units.

In another embodiment of the present invention, the cylinder head which closes off the forward cylinder chamber, and the piston are provided outside the cam pieces with hollow-cylindrical flanges axially displaceable practically without play one within the other and directed towards one another, the axial overlap and mutual displaceability of which correspond substantially to the axial displaceability of the piston, and the piston includes a trailing seal applied against the cylinder jacket and movable axially between two positions, which is effective in having the piston and cam pieces approach the cylinder head and practically ineffective in the case of the opposite piston movement. In this way, especially in starting up with an electric motor, that is to say in the case of high torque peaks at mains frequency, it is possible to prevent the pressure and thus the pressing force from pulsating at mains frequency. The operation of this one-way damping arrangement thus consists in that the hydraulic pressure can rise rapidly but fall off only slowly.

In yet another embodiment of the present invention, the torque sensor includes a vane piston rotatable through an angle in a housing with at least one radially extending vane. The housing has substantially radial walls defining the space accommodating the vane piston and each spaced at a distance equal to half the piston rotation angle from an associated substantially radial wall of the vane piston. The radial spaces formed in the case of the center position of the vane piston between its radial walls and those of the housing each correspond to the predetermined volume of the pressure medium. The radial spaces are externally and internally at least directly adjoined by a control edge in each case for the pressure medium. The pressure medium flows under the pressure prevailing in the presser cylinder to both radial spaces via an inner control edge and away over an outer control edge. In each case the vane piston or housing is in rotational connection with the friction disc or the shaft.

Within the scope of this construction it is advantageous for the vane piston to be formed of two diametrically mutually opposite vanes, for the radial spaces associated with the second vane to be connected with those of the first vane which lies diametrically opposite to them, for each two mutually diametrically opposite spaces to possess the predetermined volume, and for the second vane to have no control edges.

For this form of construction of the torque sensor the possibility again exists either of direct connection with a friction disc fixed to the shaft or the piston of the presser cylinder, the latter being firmly connected either with the vane piston or with the housing, or of separate arrangement along the lines of the principle of prefabricated units, in that the transmission shaft is divided and one part is connected with the vane piston and the other with the housing.

BRIEF DESCRIPTION OF THE DRAWINGS

FIG. 2 is an axial, cross-sectional view of a first embodiment of a torque sensor according to the invention.

FIG. 2a is a detail view of a portion of the device of FIG. 2.

FIG. 3 is a view similar to that of FIG. 2 of a modified form of the torque sensor according to the invention.

DESCRIPTION OF THE PREFERRED EMBODIMENTS

Figure 1:
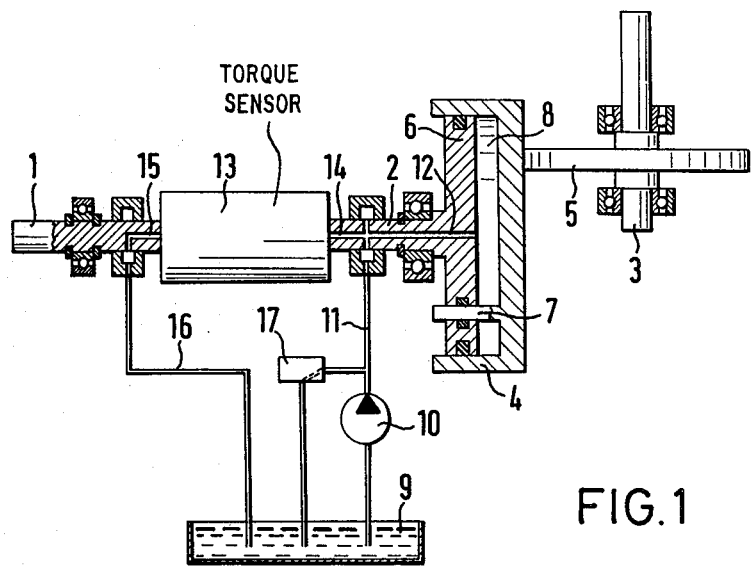
FIG. 1 is an elevational, cross-sectional, diagrammatic view of a friction disc transmission according to the invention.

Referring now to the drawings, wherein like reference numerals designate identical or corresponding parts throughout the several views, FIG. 1 thereof shows a friction wheel transmission having an input shaft divided into shaft parts 1 and 2, and an output shaft 3 arranged at right angles to shaft 1, 2. The input shaft carries a friction disc 4 and the output shaft carries a friction disc 5, the friction disc 5 rolling with its cylindrical periphery on the end face of the friction disc 4. The shaft 3 can be axially displaceable for adjustment of the transmission ratio.

To generate the pressing force necessary for friction force transmission between the discs 4 and 5, the friction disc 4 is formed as a presser cylinder which is axially displaceable on a piston 6 fixedly arranged on the end of the shaft part 2 of the input shaft and which defines therewith a pressure chamber 8. The torque drive between piston 6 and disc 4 takes place through at least one pin or the like 7 secured to disc 4 and displaceably guided axially in the piston 6.

For generating of the requisite friction force transmission pressure in pressure chamber 8, pressure medium is fed to the latter from a pressure-medium reservoir 9 by a pump 10, a conduit 11 and a bore 12 in the shaft part 2. For effecting a load-dependent adjustment of the pressure level in the chamber 8, there is provided a torque sensor 13 which connects the two shaft parts 1 and 2 together. The pressure-medium pressure prevailing in the chamber 8 is transmitted to sensor 13 through a bore 14 and the pressure-medium delivered by the pump 10 to sensor 13 can flow, with more or less throttling, through a bore 15 and a conduit 16 back again into the pressure-medium reservoir 9. An ordinary pressure relief valve 17 is connected across pump 10.

The load-dependent setting of the hydraulic pressure prevailing in the pressure chamber 8 is effected by the torque sensor 13 in such a manner that upon an increase in the torque to be transmitted by the torque sensor 13, that is to say an increase in the power transmitted by the transmission, the pressure in the pressure chamber 8 also correspondingly rises, and vice versa. The torque sensor is here designed so that the application pressure between the friction discs 4 and 5 just conforms to that required, that is to say so that there is no excess pressing and also slipping between the two friction discs is avoided.

There are a number of situations where considerable torque surges occur on the transmission, which necessitate a sudden additional volume of pressure medium for generating the requisite pressing force between the friction discs. This suddenly necessary additional volume of pressure medium cannot be made available sufficiently rapidly by the pump 10 alone if, for reasons of economy, the pump is designed for normal operation of the transmission. In order nevertheless to have this volume of pressure medium available, the torque sensor 13 is constructed in a special manner, as will be explained in greater detail below.

FIG. 2 shows, to an enlarged scale compared to FIG. 1, how the shaft parts 1 and 2 are connected with one another by the torque sensor 13 which includes a valve. For this purpose a cylinder head 20 is seated on the shaft part 1 in a manner to be rotatable with the shaft part 1 and supported against axial movement to the left, while a piston 21 is arranged on shaft part 2 to be rotatable therewith. However, piston 21 is axially displaceable relative to part 2.

The torque sensor further includes a cylinder head 27 connected in a fluid-tight manner to shaft part 2, and an annular sleeve extending between heads 20 and 27 and connected in a fluid-tight manner to at least head 27. A fluid-tight seal also exists between this sleeve and piston 21.

Heads 20 and 27 and the annular sleeve therebetween together enclose a space which is divided by piston 21 into a forward cylinder chamber at the side toward head 20 and a rear cylinder chamber 28 at the side toward head 27.

Cylinder head 20 and piston 21 carry on their faces directed towards one another, and thus in the forward chamber, cam pieces 22 and 23 provided with V-shaped recesses 24 and 25, between which rolling bodies 26 are inserted for torque transmission. The form of recess 24 and 25 is shown in FIG. 2a which is in a plane tangent to the circumference of parts 20 and 21.

Pressure medium arriving at conduit 11 and having the pressure prevailing in the pressure chamber 8 flows, through the bore 14, an adjoining radial bore 29 and an annular groove 30 terminating the bore 29, to the rear cylinder chamber 28 formed between cylinder head 27 and piston 21 and leaves this chamber again by way of an annular groove 31, an adjoining radial bore 32, the axial bore 15 departing from the bore 32 and the conduit 16 of the shaft part 1. A flange 33 extending into the rear cylinder chamber 28 and fixed to piston 21 forms, together with the annular groove 31, the throttle valve.

Piston 21 is urged toward head 20 by a compression spring whose spring constant value is selected to give the torque sensor the desired sensitivity and operating range.

Since some rotation must be permitted between shaft parts 1 and 2, the annular sleeve and/or head 27 must be mounted to rotate with one of the shaft parts and to undergo at least a small angular displacement relative to the other shaft part. According to one preferred arrangement, both the head 27 and the annular sleeve may rotate with part 2, with the sleeve being angularly displaceable relative to head 20. The advantage of this arrangement is that relative angular movement will occur between surfaces which only seal a region in communication with fluid at the low pressure side of the fluid system.

The manner of operation of the torque sensor 13 thus described is as follows:

In accordance with the torque to be transmitted between the shaft parts 1 and 2, the cylinder head 20 and piston 21 tend to rotate relative to one another in the circumferential direction. As a result, by the action of the V-shaped recesses 24 and 25, the cam pieces 22 and 23 and the rolling bodies 26 lying therebetween, the piston 21 is shifted more or less to the right, relative to the direction of the view shown in FIG. 2. Thus, the throttle valve 33, 31 progressively closes and correspondingly decreases the outflow of the pressure medium flowing by way of path 11, 14, 29 and 30 into the cylinder chamber 28, more or less until the pressure medium pressure prevailing in the cylinder chamber 28, acting on the piston 21, balances out the axial force which is exerted from the other side through the cam pieces 22 and 23 and the rolling bodies 26. Of course, as the throttle valve closes in response to increased torque, the pressure in chamber 28 rises. The pressure-medium pressure in the pressure chamber 8 corresponds to that in the cylinder chamber 28, since the cylinder chamber 28 is in communication through the bore 12 with the pressure chamber 8.

If now a torque surge occurs, which changes the relative positions of the cam pieces 22 and 23 acted on by the interposed rolling bodies 26, the result is that the piston 21 is shifted in a very short time away from the cylinder head 20, i.e. to the right. This results in the closure of the annular groove 31 and thus prevents further outflow of the pressure medium from chamber 28. The volume of pressure medium situated in the cylinder chamber 28 is now conveyed via the annular groove 30 and the conduits 29, 14 and 12 correspondingly quickly into the pressure chamber 8 and is there available to increase the pressure level acting on disc 4. When the torque surge has passed, return of the piston 21 to its normal working position is effected by means of the pressure-medium pressure, which is also elevated, in the cylinder chamber 28 until the throttling being produced by the valve defined by flange 33 and annular groove 31 again establishes the pressure-medium pressure necessary for the generation of the new load-dependent pressing force.

In FIG. 2a, each recess is shown to have side walls presenting respectively different inclinations. The purpose for this is described in U.S. Pat. No. 3,600,960, issued to Erhardt Karig et al on Aug. 24th, 1971, particularly at columns 9 and 10.

FIG. 3 shows a modified embodiment of the torque sensor according to FIG. 2, where identical parts bear the same reference numerals and will not be described again.

In FIG. 3 the cylinder head 20 and piston 40, comparable to piston 21, have respective hollow cylindrical flanges 41 and 42 directed towards one another and displaceable one within the other axially practically without play, while contacting one another via facing circumferential surfaces between which is disposed a seal. In addition, piston 40 has a draw seal 43 the sealing function of which is performed only when the seal is in the position illustrated in FIG. 3. When seal 43 moves, relative to piston 40, to the left from the illustrated position, against stops 44, which occurs when piston 40 moves to the right, the seal develops no sealing effect, because then the pressure medium from the cylinder chamber 28 can flow at the bottom around the seal 43 and between the stops 44 into the annular space 45 formed between flanges 41 and 42 and the annular sleeve joining heads 20 and 27. Stops 44 are a plurality of pieces spaced around the circumference of piston 40 with fluid paths existing there between and fixed to piston 40.

This form of construction leads to a damping of the movements of the piston 40 in the direction towards the cylinder head 20, while the movements of the piston 40 away from the cylinder head 20 are undamped. This means that the torque sensor can carry out, without hindrance, the function, described with reference to FIG. 2, of delivering a specific pressure-medium volume in the case of torque surges, whereas especially for starting-up of the transmission, reciprocating fluctuating movements of the piston 40 are damped and thus the corresponding pressure-medium pressure establishes itself in a smoother or more regular form.

It is common to the embodiments shown in FIGS. 2 and 3 that the volume of the cylinder chamber 28, that is to say the additional volume available in the case of torque surges, can easily be selected by design, especially by appropriately dimensioning the axial distance between the annular grooves 30 and 31. In the embodiment of FIG. 3, the volume which the annular space 45 can accommodate must additionally be taken into consideration.

As in FIG. 2, a compression spring, the internal diameter of which is greater than the external diameter of flange 33, can be arranged between piston 40 and the cylinder head 27.

Figure 4:
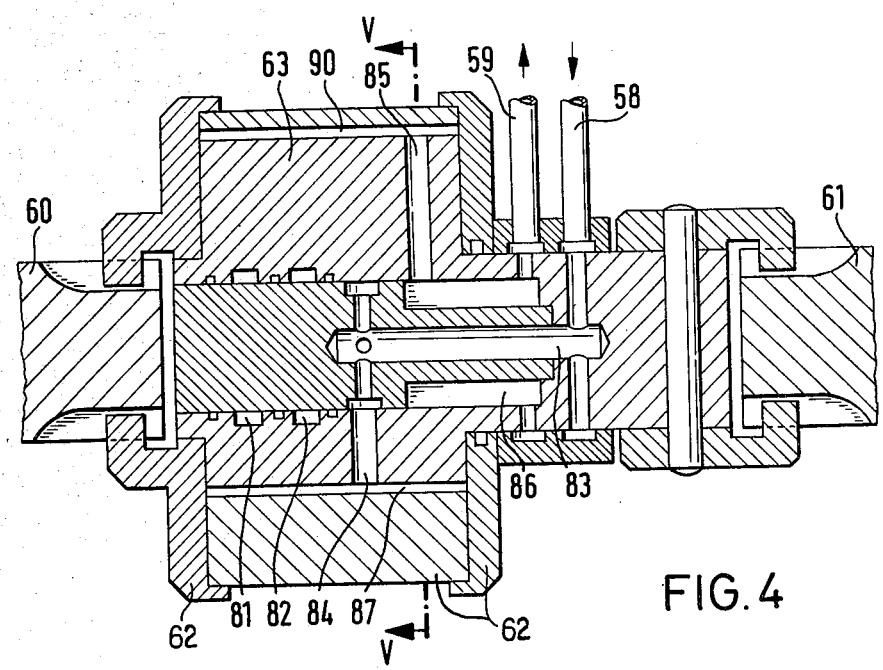
FIG. 4 is an axial, cross-sectional view of another embodiment of a torque sensor taken along the line IV—IV of FIG. 5.
Figure 5:
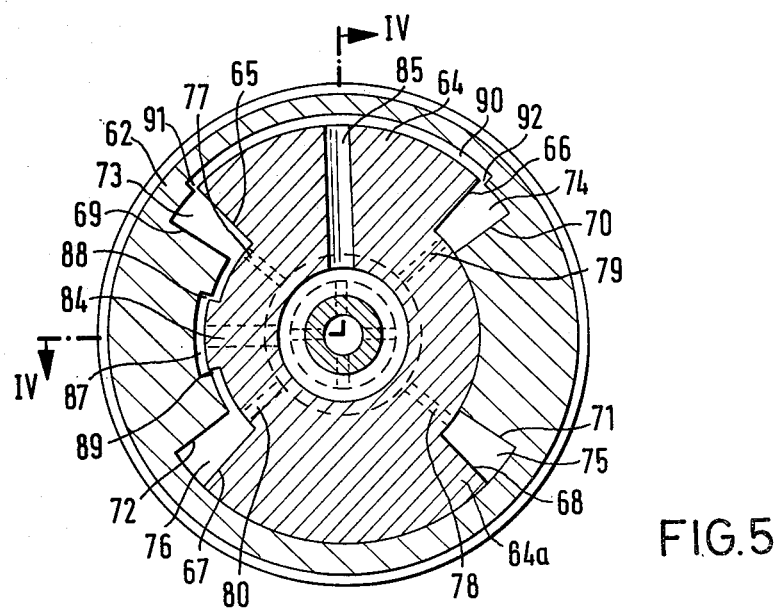
FIG. 5 is a cross-sectional view along the line V—V of FIG. 4.

In the embodiment of the torque sensor shown in FIGS. 4 and 5 the shaft on which the torque sensor is arranged is again divided into two parts 60 and 61. Connected to rotate with shaft part 60 is a housing 62 composed of two axially spaced end pieces and an annular jacket connected between the end pieces in a sealing manner, while a vane piston 63 is connected to rotate with shaft part 61. Vane 63 is provided with two diametrically mutually opposite vanes 64 and 64a.

The vane piston 63 is rotatable through a specific angular distance in the housing 62, for which purpose the housing is formed with substantially radial walls 69, 70, 71 and 72 each associated with a respective one of the radial walls 65, 66, 67 and 68 presented by piston 63.

When piston 63 is in its centered position, shown in FIG. 5, each housing radial wall 69–72 is angularly offset from its associated piston radial wall 65–68 by an angle equal to one-half the specific angular distance through which piston 63 can rotate. Thus radial spaces 73, 74, 75 and 76 are formed, with each pair of diametrically mutually opposite spaces 73, 75 and 74, 76 being connected with one another by bores 77, 78 and 79, 80 and annular conduits 81 and 82. Bores 77 and 78 communicate with conduit 81, and bores 79 and 80 communicate with conduit 82.

In the case as illustrated, the pressure medium coming from the pump flows to the vane piston through an inlet conduit 58, an axial bore 83, and a radial bore 84. Conduit 58 can also be connected to a presser cylinder pressure chamber, such as 8. The outflow of the pressure medium to the reservoir is possible through a radial bore 85 of the vane piston, an axial, annular conduit 86 adjoining this bore, and finally a conduit 59.

Adjoining the downstream end of radial bore 84, the vane piston and housing form, radially enclosed by spaces 73 and 76, an arcuate ring space 87 bordered radially by control edges 88 and 89 which lie side by side in the circumferential direction. The radial bore 85 is preceded by an annular space 90 extending in the circumferential direction and located radially outside of the vane 64 and of the radial spaces 73 to 76. Space 90 is bordered radially by control edges 91 and 92 adjoining this annular space.

The manner of operation of the torque sensor according to FIGS. 4 and 5 is as follows:

With reference to FIG. 5 it is assumed that the torque being transmitted urges the vane piston 63 to rotate in the clockwise direction in relation to the housing 62. This has the consequence that the pressure medium flowing away via the torque sensor is throttled at the control edges 88 and 92 to an extent dependent on the level of the torque. Throttling at control edge 92 occurs because space 74 is in communication with space 87 via space 76 and conduits 79, 80 and 82.

If now a torque surge occurs, the vane piston rotates further in the clockwise direction relative to the housing so that the control edges 88 and 92 are both closed and the pressure-medium situated in the radial spaces 74 and 76 is forced past control edge 89 and through bore 84 to the pressure chamber which delivers the pressing force for the transmission.

When the torque surge ends, the radial spaces 74 and 76 are "pumped up" again by pressure medium flowing in through conduit 58, whereby a return of the vane piston in the counter-clockwise direction in relation to the housing takes place until the fluid flow gaps defined at control edges 88 and 92 assume dimensions which lead to a throttling of the outflow of pressure medium sufficient to establish the desired relation between the hydraulic pressure necessary in the pressure chamber and the applied torque.

Otherwise if the torque being transmitted urges the vane piston 63 to rotate in the counterclockwise direction, the manner of operation is equivalent with the control edges 91 and 89 and the radial spaces 73 and 75.

The torque sensors shown in FIGS. 2 and 3 are adapted in design to the transmission shown in FIG. 1. On the other hand the torque sensor shown in FIGS. 4 and 5 is adapted in design rather for use with the transmission to be described below with reference to FIG. 10. However, the possibility of mutual design adaptation also exists, of course, in that, for example, the torque sensor of FIGS. 4 and 5 could be adapted for use with the transmission of FIG. 1 by extending the bore 83 through into the shaft part 61, to the right in FIG. 4, in a suitable manner. Conversely, for use with the transmission of FIG. 10, the torque sensors of FIGS. 2 and 3 could be modified by closing bore 12.

The torque sensors shown in FIGS. 2 to 5 can suitably be added, as shown in FIG. 1, as prefabricated units if necessary, to a basic transmission of known design. However, the possibility of course also exists of making the torque sensors as a fixed component of the transmission, in a space-saving manner. For this purpose, by way of example, in the torque sensor illustrated in FIGS. 2 and 3 the cylinder head 27 can form one component with the piston 6 of the transmission shown in FIG. 1.

Alternatively in the form of construction shown in FIGS. 4 and 5 it is possible to connect the housing 62 or the vane piston 63 in one piece with the piston 6. It will be explained hereinafter with reference to FIG. 11 how such an integration as a transmission component is possible by way of example in a cone-pulley belt-type transmission.

Figure 6:
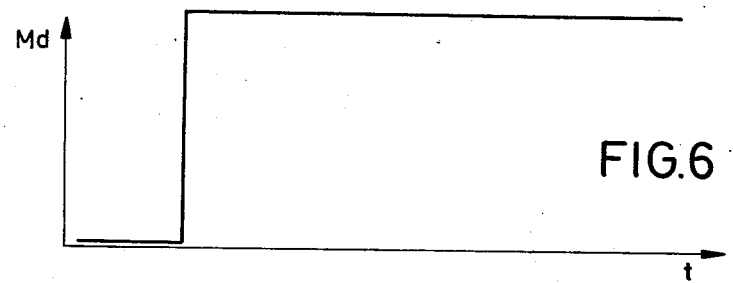
FIGS. 6 and 7 are performance diagrams illustrating the operation of torque sensors according to the invention.
Figure 7:
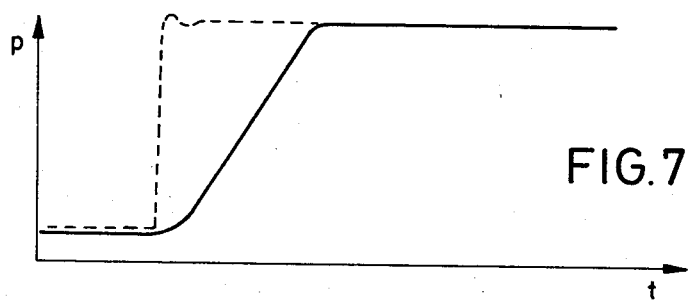

FIG. 6 shows in graphic illustration the occurrence of a torque surge while FIG. 7 shows the corresponding pressure-medium pressure change, both as a function of time. In FIG. 7, the solid line illustrates the response of a torque sensor of known type. The oblique rise of this curve shows that the pump is able to build up the requisite pressure only with a time delay. The broken line shows the pressure build-up achieved by a torque sensor according to the invention, from which it can be seen that here a time delay practically does not exist.

Figure 8:
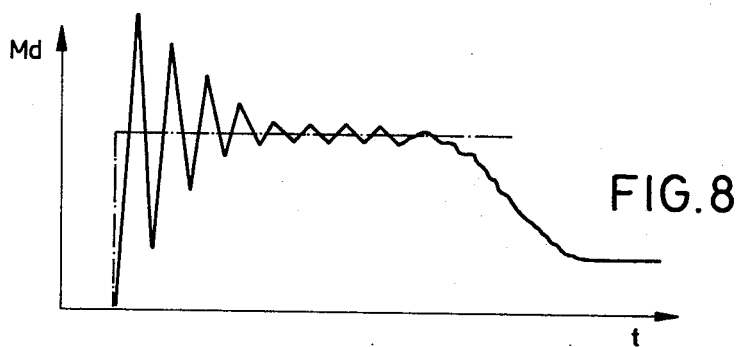
FIG. 8 is a diagram similar to that of FIG. 6 showing the torque of an electric motor in the start-up operation.

FIG. 8 shows the torque developed as a function of time during start-up operation of an electric motor.

Figure 9:
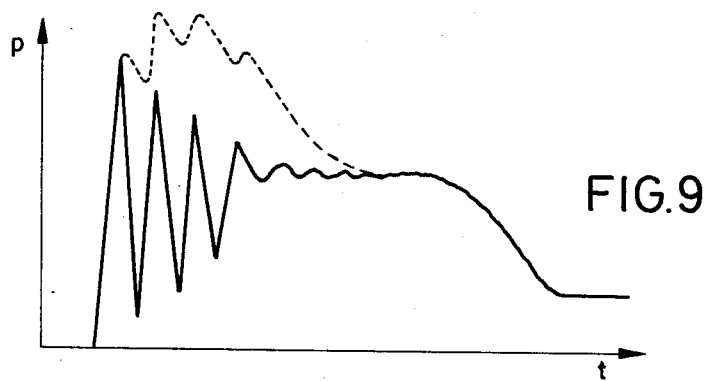
FIG. 9 is a diagram similar to that of FIG. 7 showing modes of operation of the torque sensors of FIG. 3 and FIG. 11.

FIG. 9 depicts the corresponding behavior of the pressure-medium pressure, established by way of the torque sensor. In FIG. 9, the solid line illustrates the behavior of an undamped torque sensor, for example that shown in FIG. 2, while the broken line represents the response of a damped torque sensor, for example that of FIG. 3.

Figure 10:
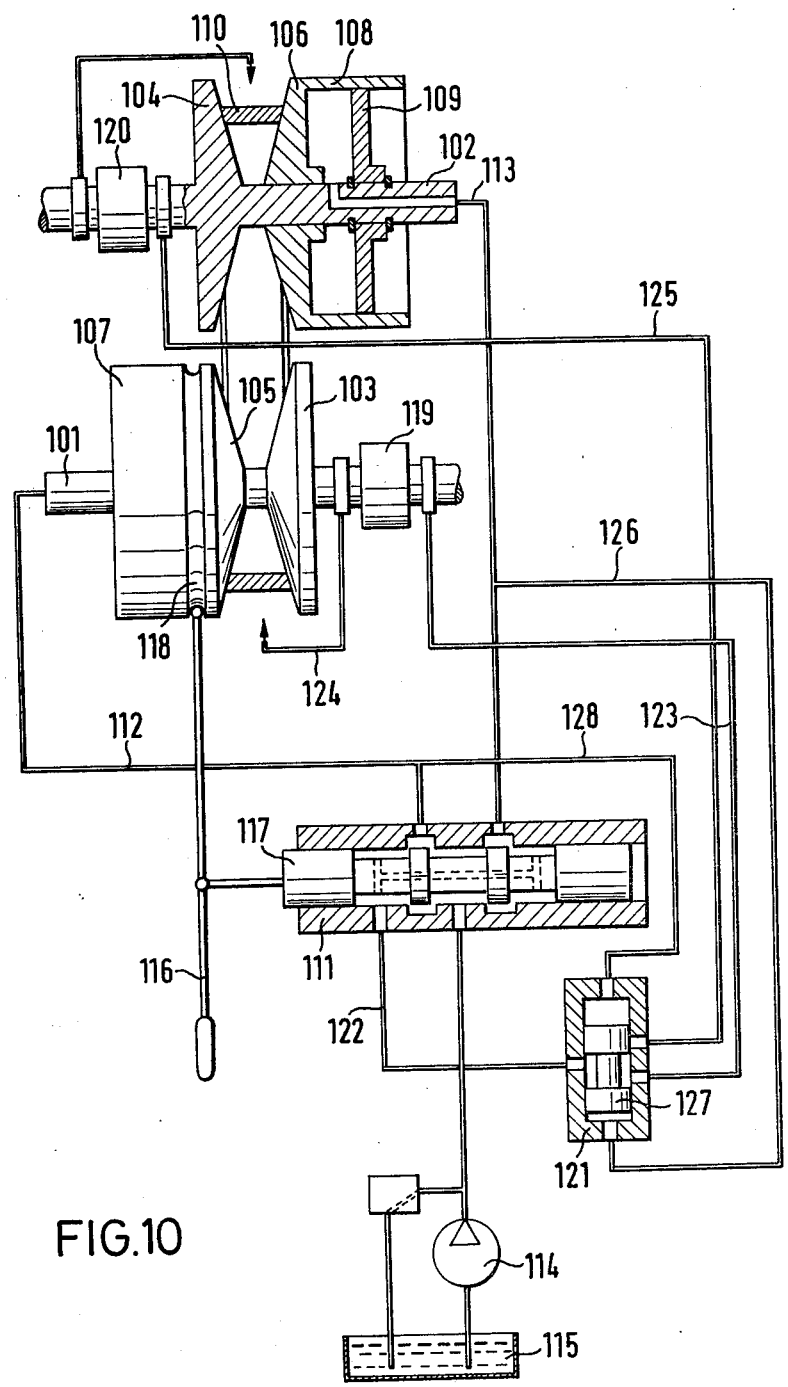
FIG. 10 is a partly cross-sectional diagrammatic view of a cone-pulley belt-type transmission for manual setting and with torque sensors on both sides of the transmission.

FIG. 10 illustrates a cone-pulley belt-type transmission similar in organization to that shown in FIG. 7 of U.S. Pat. No. 3,600,960, and operated in the manner disclosed in U.S. Pat. No. 3,451,283. The transmission is composed of a two-part drive-input shaft 101 and a two-part drive-output shaft 102, each shaft being firmly connected to a respective cone-pulley 103 or 104, while an opposite cone-pulley 105 or 106 is axially displaceable on, but rotatable with, each shaft 101 and 102. Each pulley 105 and 106 defines a respective cylinder 107 or 108 in which there is arranged a piston 109 axially and rotationally fast on the respective shaft 101 or 102. A traction member 110, e.g. a belt, travels between the cone-pulley pairs 103, 105 and 104, 106 to drive pulleys 104, 106 from pulleys 103, 105.

Driving power is supplied to the transmission via the right-hand part of shaft 101 and is transmitted to the left-hand part thereof via a torque sensor 119. Similarly, the output power from the transmission is taken off from the left-hand part of shaft 102 which is connected to the right-hand part thereof by a torque sensor 120.

For the maintenance or variation of the transmission ratio, pressure medium is drawn by a pressure-medium pump 114 from an oil reservoir 115 to a control slide valve 111 provided with four control edges and arranged to distribute medium to the chambers of the cylinders 107 and 108. A control lever 116 is connected with the slider 117 of valve 111 and has a free end which engages in a groove 118 of the cylinder 107, the lever 116 being manually actuatable at its other free end.

If the transmission tends to deviate from the ratio setting set by hand, this leads, in view of the engagement of control lever 116 in the groove 118, to a translational movement of lever 116 and a displacement of the control slide valve 117, which ensures in a known manner a resetting or retention of the manually set transmission ratio. Such operation is described in the above-cited U.S. Pat. No. 3,600,960. The corresponding happens if the transmission setting is altered by hand, by displacing the lower free end of control lever 116, until the set transmission ratio is reached and the new transmission condition has adjusted itself there.

The manner of operation of the slide valve 111 in the example as described here consists in that pressure medium is supplied to cylinder 107 at the input side of the transmission through a conduit 112, while at the output side of the transmission the return of the pressure-medium is throttled in proportion to loading. For this purpose there serve two torque sensors 119 and 120, each having a throttle valve, and a changeover device in the form of a switching slide valve 121 which acts to assure that at all times the torque sensor arranged on the drive-input side is effective for influencing the pressing force on the cone-pulley pair at the drive-output side.

In the present case the shaft 101 is designated as the drive-input shaft. Accordingly the position of the slider 117 determines the distribution of pressure medium to the cylinder 107 of the shaft 101 by the pump 114 through the conduit 112 directly according to the setting of the transmission ratio-setting lever 116. On the other hand in the position of equilibrium, as illustrated, the access of the pressure medium to the conduit 113 is opened less or hardly at all. On the other side, the pressure medium supplied to the torque sensor 119 via the outer control edges of the slider 117, the conduits 122 and 123 and device 121 can flow away from the torque sensor, by way of example, through a conduit 124 for lubrication of member 110 only in dependence on the valve setting of the sensor 119.

This function, with the parts described in connection therewith, is sufficient if in a transmission an interchange is not to be expected between the drive-input and drive-output shafts. If however such interchange can occur, then torque sensor 120 is also provided, on the shaft 102, for the case where the shaft 102 becomes the drive-input shaft and the shaft 101 becomes the drive-output shaft. Now in order to permit the torque sensor 120 to become effective through the conduits 122 and 125 for this case, then the drive-input pressure now present in the cylinder 108 passes through a conduit 126 to the changeover device 121 and displaces the piston 127 thereof upwardly in comparison with the position shown in FIG. 10. If, subsequently, the shaft 101 again becomes the drive-input shaft, the drive-input pressure passes through the conduit 128 to the piston 127 and returns it into the position shown in FIG. 10.

Each torque sensor 119 and 120 of FIG. 10 can be constructed, by way of example, as described with reference to FIG. 2, FIG. 3, or FIGS. 4 and 5. In order to explain this only with respect to FIG. 2, the bore 12 should be closed, the shaft 101 or 102 should be divided within the torque sensor, the conduit connection 11 would correspond to the conduit 123 or 125 and the conduit connection 16 would correspond to the conduit 124, or the corresponding conduit of sensor 120. This is valid, as regards pressure-medium inflow and outflow for the torque sensor, correspondingly for the embodiment of FIGS. 4 and 5.

Figure 11:
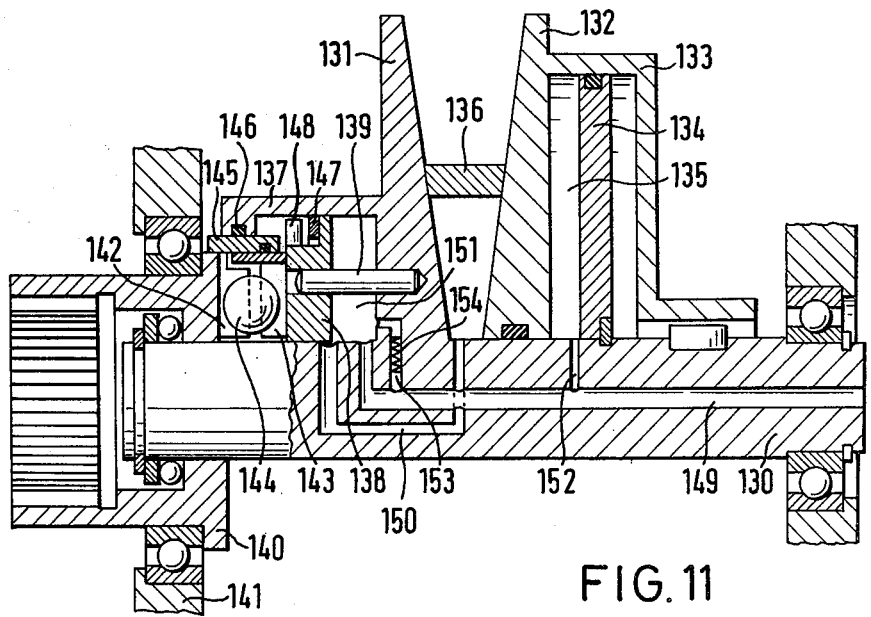
FIG. 11 is a cross-sectional view illustrating a modified embodiment and arrangement of a torque sensor similar to that of FIG. 3, for a cone-pulley belt-type transmission.

In the transmission shown in FIG. 10 the situation as described is that in each case the torque sensor on the drive input shaft controls the pressure-medium pressure in the presser cylinder on the drive output shaft. FIG. 11 shows a cone-pulley transmission portion in which, as in the case of FIG. 1, the torque sensor controls the pressure-medium pressure and thus the pressing force of the pulley assembly on the shaft on which the sensor is itself arranged. Thus in comparison with the arrangement of FIG. 10, a somewhat different pressing behavior occurs, which however is not important for the object of the present invention. Moreover FIG. 11 is an example of how in a cone-pulley belt-type transmission, the torque sensor, which corresponds in principle to that of FIG. 3, is united with a cone-pulley to form one construction unit.

As shown in FIG. 11 a cone-pulley 131 is firmly connected with a shaft 130 while a cone-pulley 132 is axially displaceable on this shaft while being rotatable as a unit therewith. The cone-pulley 132 defines a cylinder 133 in which there is seated a piston 134 fast with the shaft, while between the cone-pulley 132 and piston 134 a pressure chamber 135 is formed. A traction member 136 comparable to member 110 of FIG. 10, travels between the cone-pulleys 131 and 132.

A cylinder 137 is formed in one piece with the cone-pulley 131 and houses an annular piston 138 which is displaceable axially along shaft 130 and is connected in rotation with the cone-pulley 131 by means of pins 139. Opposite to the annular piston 136 there is a sleeve 140 which is rotatably mounted in a gear box 141 and in which the shaft 130 is rotatably mounted. Shaft 130 is prevented from experiencing any axial movement to the right relative to sleeve 140.

Sleeve 140 and piston 138 carry respective cam sleeves 142 and 143 on the end faces facing one another, between which rolling bodies 144 are inserted. There are further provided hollow cylindrical flanges 145, 146, a trailing seal 147 and stops 148, corresponding to components 41, 42, 43 and 44, respectively, of the torque sensor of FIG. 3, so that they will not be described further here.

The same is true for the pressure-medium supply line 149 and the more or less throttled pressure-medium return line 150 which correspond to the embodiment of FIG. 3. Here again the pressure prevailing in the cylinder chamber 151 is dependent on the throttle position of the piston 138 and is equal to the pressure established in the pressure chamber 135, through the bore 152, to generate the pressing force.

Unlike the torque sensor of FIG. 3, the embodiment shown in FIG. 11 includes, in parallel with the conduit 149 near the cylinder chamber 151, a secondary conduit 153 which opens into the end of the cylinder chamber 151 lying opposite to the piston 138 and in which a constrictor 154, which may be of a screw-type, is arranged. In the event of a torque surge, this screw-type constrictor has the effect of preventing the piston 138 from striking hard against the cone-pulley 131. Rather, piston 138 approaches it in damped manner, and is shifted for its return movement firstly by means of the pressure-medium flow possible through the constriction 154.

It should be mentioned, for the sake of completeness, that in FIG. 11 only the part of the torque sensor above the axis of shaft 130 is shown. However, it is of course a component rotating about the shaft in conformity with the illustration according to FIG. 3, and thus in reality extends completely around the shaft.

It will be understood that the above description of the present invention is susceptible to various modifications, changes and adaptations, and the same are intended to be comprehended within the meaning and range of equivalents of the appended claims.

What is claimed is:

1. Friction transmission device comprising:

at least one rotatably mounted shaft;

means defining a presser cylinder and piston assembly composed of a cylinder member and a piston member mounted in said cylinder member, both of said members being mounted to rotate with one said shaft, one of said members defining a friction disc arranged to press against a cooperating element for transmission of motion between such element and said disc, the other of said members being fixed to the shaft on which said members are mounted, and both of said members defining a presser cylinder chamber for receiving hydraulic fluid at a pressure for urging said disc against the element with a force dependent on the friction force required to transmit motion between such element and said disc; and means defining a torque sensor mounted on one said shaft and hydraulically connected to said presser cylinder chamber, said sensor defining a fluid flow control valve composed of two valve parts movable relative to one another to an extent dependent on the torque imposed on the shaft on which said sensor is mounted for exclusively controlling the pressure in said pressure cylinder chamber in dependence on the torque imposed on the shaft on which said sensor is mounted;

wherein said valve parts are constructed for delivering a predetermined supplemental volume of hydraulic pressure fluid to said presser cylinder chamber upon a predetermined relative movement between said valve parts in a direction to increase the pressure in said presser cylinder chamber.

2. A device as defined in claim 1 wherein said sensor comprises:
a rotatable sensor cylinder composed of a jacket and two end pieces closing the ends of said jacket in a liquid-tight manner, and fixed axially and circumferentially to the shaft associated with said sensor;
a sensor piston mounted inside said sensor cylinder for rotation with, and axial displacement relative to, the associated shaft to transmit the torque on the associated shaft, said sensor piston dividing said sensor cylinder into a forward cylinder chamber and a rear cylinder chamber, each said chamber being delimited at one end by a respective end piece and said rear chamber being in fluid communication with said presser cylinder chamber;
a first cam piece carried by said sensor piston at the side thereof facing said forward cylinder chamber, and a second cam piece carried by that one of said end pieces delimiting one end of said forward cylinder chamber, at the side thereof facing said forward cylinder chamber, said cam pieces being spaced axially apart and each carrying V-shaped recesses which open toward the other said cam piece; and
a plurality of rolling bodies each inserted between said cam pieces and engaging a respective recess on each said cam piece for transmitting torque on the associated shaft between said cam pieces, said rolling bodies cooperating with the sides of said recesses for moving said sensor piston axially away from said end piece delimiting one end of said forward cylinder chamber by a distance proportional to the torque imposed on the associated shaft, the movement of said sensor piston controlling the movement of said valve parts relative to one another in a manner to cause the pressure in said presser cylinder chamber to generate the force required to transmit motion between such element and said disc and to balance the axial force exerted on said sensor piston by said rolling bodies;
wherein the volume of said rear cylinder chamber and the travel path of said sensor piston are dimensioned to provide said predetermined volume of hydraulic fluid and the connection of said rear cylinder chamber to said presser cylinder chamber is located to maintain said chambers in communication over substantially the entire axial travel path of said sensor piston.

3. A device as defined in claim 2 wherein the shaft associated with said sensor is provided with a radial bore and an axial bore communicating therewith for conducting pressure fluid away from said rear cylinder chamber, and with a peripheral groove communicating with the radially outer end of said radial bore and defining one of said valve parts, and said sensor piston is provided with means defining a control edge cooperating with said groove and defining the other of said valve parts.

4. A device as defined in claim 3 wherein the shaft associated with said sensor is further provided with a second radial bore and a second axial bore communicating therewith for conducting pressure fluid to said rear cylinder chamber, and with a second peripheral groove communicating with the radially outer end of said second radial bore and located to be traversed by said control edge during movement of said sensor piston over its travel path, and wherein the axial distance between the centers of said peripheral grooves corresponds to the distance which said sensor piston must travel to displace the predetermined supplemental volume of hydraulic fluid.

5. A device as defined in claim 2 wherein said rear cylinder chamber is provided with an inlet passage for receiving hydraulic fluid and said sensor piston is provided with means defining a control edge positioned to close said inlet passage when said sensor piston is in the vicinity of the end of its travel path directed toward that one of said end pieces delimiting one end of said rear cylinder chamber.

6. A device as defined in claim 5 wherein said means defining a control edge comprises a flange forming part of said sensor piston and extending axially into said rear cylinder chamber.

7. A device as defined in claim 6 wherein said sensor further comprises a helical compression spring having a helical internal diameter greater than the outer diameter of said flange and supported between said sensor piston and said end piece delimiting one end of said rear cylinder chamber.

8. A device as defined in claim 2 wherein: the shaft associated with said sensor is constituted by first and second shaft parts rotatable relative to one another; said sensor piston and said first cam piece are mounted to rotate with, and to be axially displaceable relative to, said first shaft part; said end piece delimiting one end of said forward cylinder chamber and said second cam piece are mounted to rotate with said second shaft part; and said sensor cylinder is constructed such that at least said end piece delimiting one end of said forward cylinder chamber is rotatable relative to said first shaft part.

9. A device as defined in claim 8 further comprising means supporting said end piece delimiting one end of said forward cylinder chamber axially at its side remote from said forward cylinder chamber.

10. A device as defined in claim 2 wherein said end piece delimiting one end of said rear cylinder chamber forms a rigid unit with a friction disc.

11. A device as defined in claim 2 wherein said end piece delimiting one end of said rear cylinder chamber forms a rigid unit with said presser piston member.

12. A device as defined in claim 2 further comprising means defining a secondary fluid path extending between said presser cylinder chamber and said rear cylinder chamber, via said end piece delimiting one end of said rear cylinder chamber, and flow constriction means disposed in said secondary fluid path.

13. A device as defined in claim 2 further comprising: two hollow cylindrical flanges each carried by a respective one of said end piece delimiting one end of said forward cylinder chamber and said sensor piston and located radially outside of said cam pieces, said flanges being dimensioned to be axially displaceable relative to one another substantially without play and to have an axial overlap and mutual displaceability which correspond to the full axial travel path of said sensor piston; and a trailing seal carried by said piston and contacting said sensor cylinder jacket in a manner to provide a sealing effect between said sensor piston and said jacket during movement of said sensor piston toward said end piece delimiting one end of said forward cylinder chamber and effectively no sealing effect during movement of said sensor piston in the opposite direction.

14. A device as defined in claim 1 wherein said torque sensor comprises: a vane piston provided with at least one vane having two radially extending side walls; a hollow housing in which said vane piston is disposed to be rotatable relative to said housing through a selected angle, the interior of said housing presenting two substantially radial walls disposed at respectively opposite sides of said vane and enclosing an angle which exceeds the angle enclosed by said side walls of said vane by an amount equal to the selected angle, such that the interior of said housing defines two spaces each bounded by a respective radial wall of said housing and a respective radially extending wall of said vane, each said space having, when said vane is centered between said housing radial walls, a volume equal to said predetermined supplemental volume of hydraulic fluid; inlet conduit means for conducting hydraulic fluid and the pressure prevailing in said presser cylinder chamber to said spaces; and outlet conduit means for conducting hydraulic fluid out of said spaces; the interior of said housing and said vane piston being constructed to present at least one inner control edge interposed between said inlet conduit means and said spaces and at least one outer control edge interposed between said spaces and said outlet conduit means, for controlling the flow of hydraulic fluid to and from said spaces; and one of said vane piston and housing being connected to rotate with one of said friction disc and shaft.

15. A device as defined in claim 14 wherein said vane piston is provided with two said vanes disposed diametrically opposite one another, the interior of said housing presents two sets of said radial walls, the radial walls of each set being disposed at respectively opposite sides of a respective vane, each said space is composed of a first partial space adjacent one radially extending wall of one said vane and a second partial space adjacent one radially extending wall of the other said vane, and said sensor further comprises conduit means placing both of said partial spaces of each said space in communication.

16. A device as defined in claim 14 wherein said inlet conduit means comprise an axial bore and a radial bore in said vane piston, said bores communicating with one another and said radial bore extending to the periphery of said vane piston.

* * * * *